United States Patent [19]

Shimada et al.

[11] Patent Number: 4,821,032

[45] Date of Patent: Apr. 11, 1989

[54] COMMUNICATION SYSTEM FOR VIDEO INFORMATION APPARATUS

[75] Inventors: Keiichiro Shimada; Shinji Takada; Mitsugu Ishihara, all of Kanagawa; Yukihiko Machida, Tokyo, all of Japan

[73] Assignee: Sony Corporation, Tokyo, Japan

[21] Appl. No.: 812,529

[22] Filed: Dec. 23, 1985

[30] Foreign Application Priority Data

Dec. 21, 1984 [JP] Japan .................................. 59-270042
Dec. 28, 1984 [JP] Japan .................................. 59-280077

[51] Int. Cl.$^4$ .......................... H04Q 9/00; H04J 3/02; G05B 19/02; H04N 5/24
[52] U.S. Cl. .......................... 340/825.210; 358/194.1; 358/185; 340/825.240; 340/825.500
[58] Field of Search ...................... 340/825.21, 825.24; 358/194.1, 86, 210, 84, 185; 455/2

[56] References Cited

U.S. PATENT DOCUMENTS

| 4,268,722 | 5/1981 | Little et al. | 370/110 |
|---|---|---|---|
| 4,450,487 | 5/1984 | Koide | 358/210 |
| 4,509,073 | 4/1985 | Baran et al. | 358/86 |
| 4,570,257 | 2/1986 | Olson et al. | 340/825.51 |
| 4,593,282 | 6/1986 | Acampora et al. | 340/825.5 |
| 4,598,287 | 7/1986 | Osakabe et al. | 358/194.1 |
| 4,621,259 | 11/1986 | Schepers et al. | 340/707 |
| 4,626,847 | 12/1986 | Zato | 340/825.24 |
| 4,628,311 | 12/1986 | Milling | 340/825.5 |
| 4,713,805 | 12/1987 | Henaff | 340/825.5 |

FOREIGN PATENT DOCUMENTS 0069561  1/1983 European Pat. Off. .
0090292 10/1983 European Pat. Off. .

OTHER PUBLICATIONS

Wireless World, vol. 89, No. 1574, Nov. 1983, pp. 44-48, Sheepen Place, Olchester, GB, P. Barker "Video disc programming for interactive video".

Primary Examiner—Donald J. Yusko
Attorney, Agent, or Firm—Lewis H. Eslinger; Donald S. Dowden; Jay H. Maioli

[57] ABSTRACT

A communication system for video information apparatus for carrying out a communication between a video information apparatus and a peripheral apparatus arranged so that a communication is repeatedly carried out at a period synchronized with a signal of a vertical period having a constant phase relation relative to a vertical synchronizing signal.

6 Claims, 9 Drawing Sheets

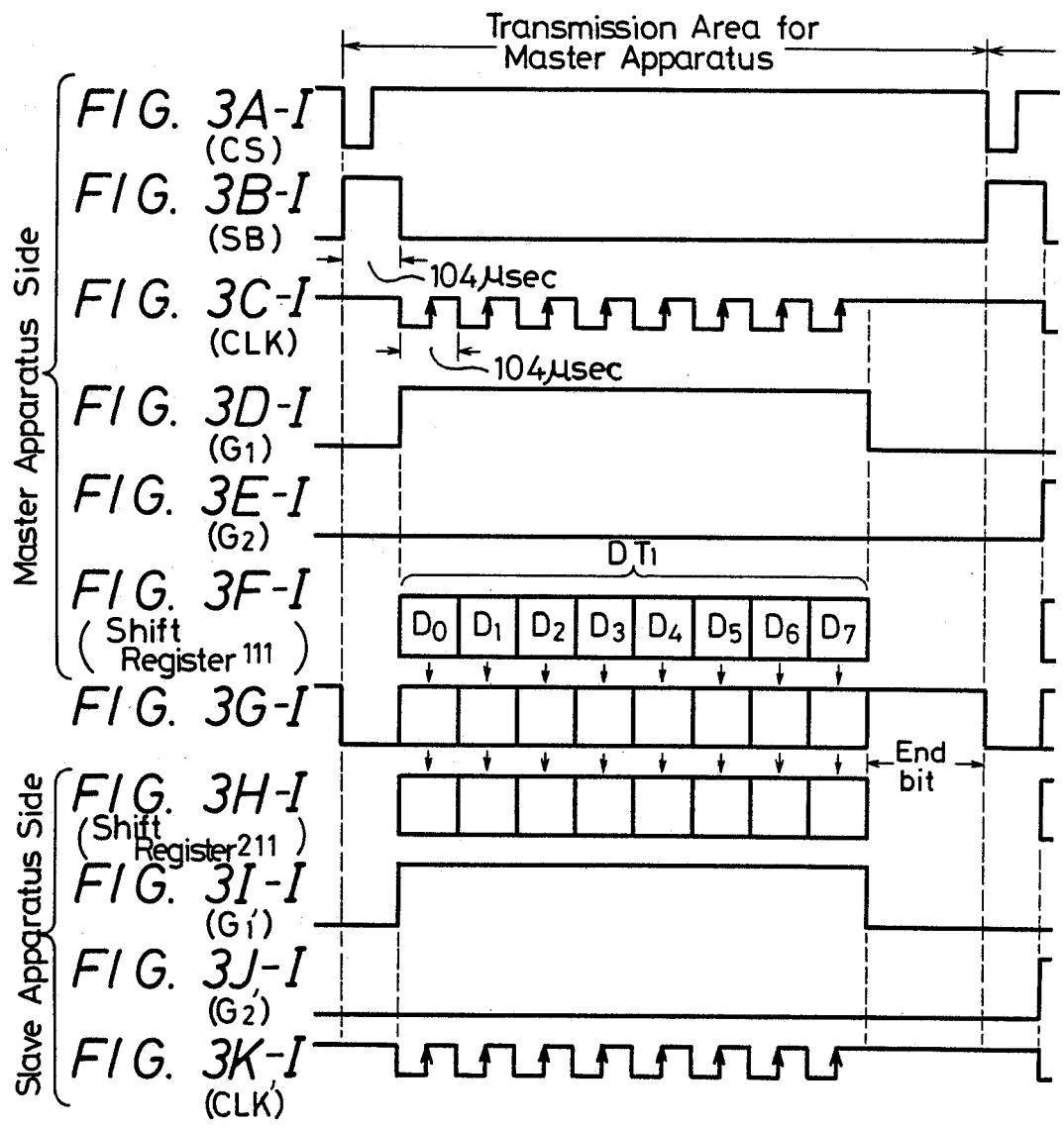

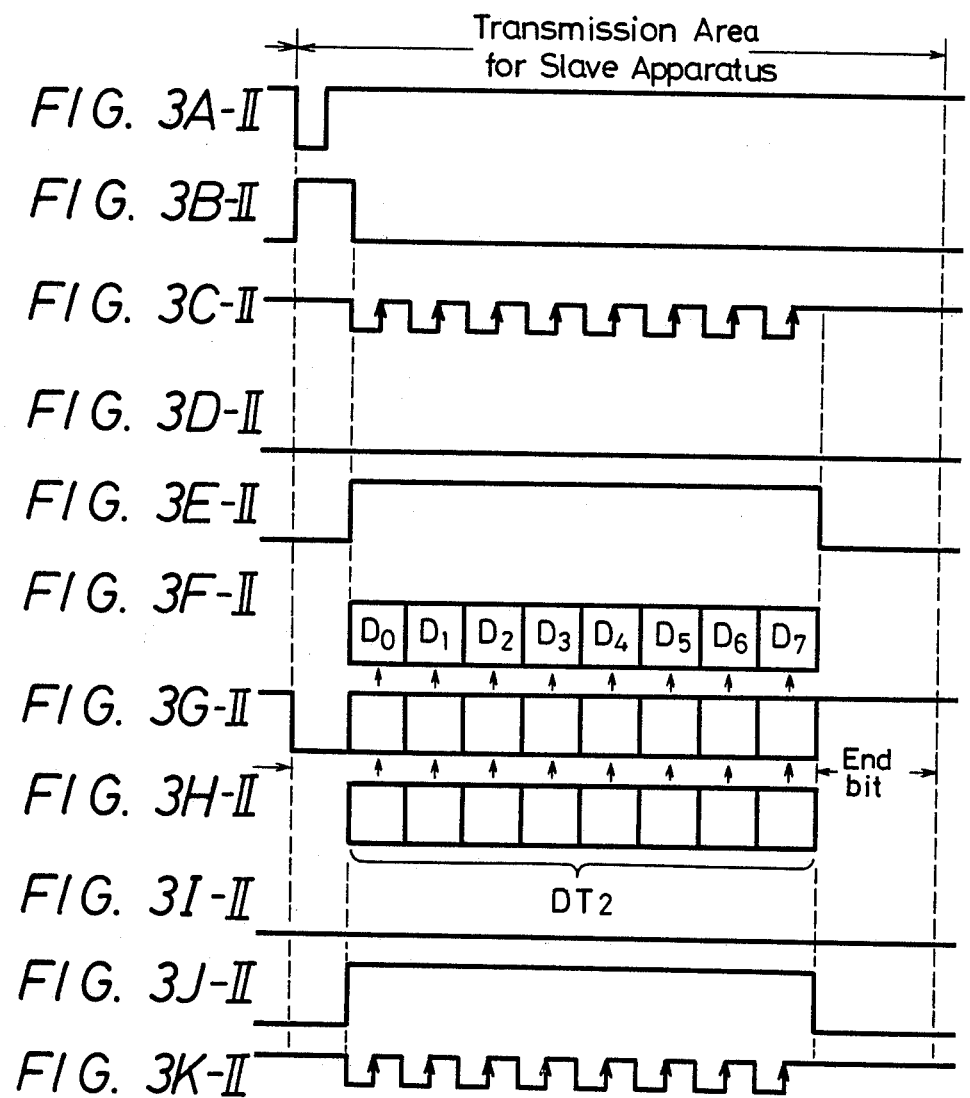

FIG. 8A (VD)

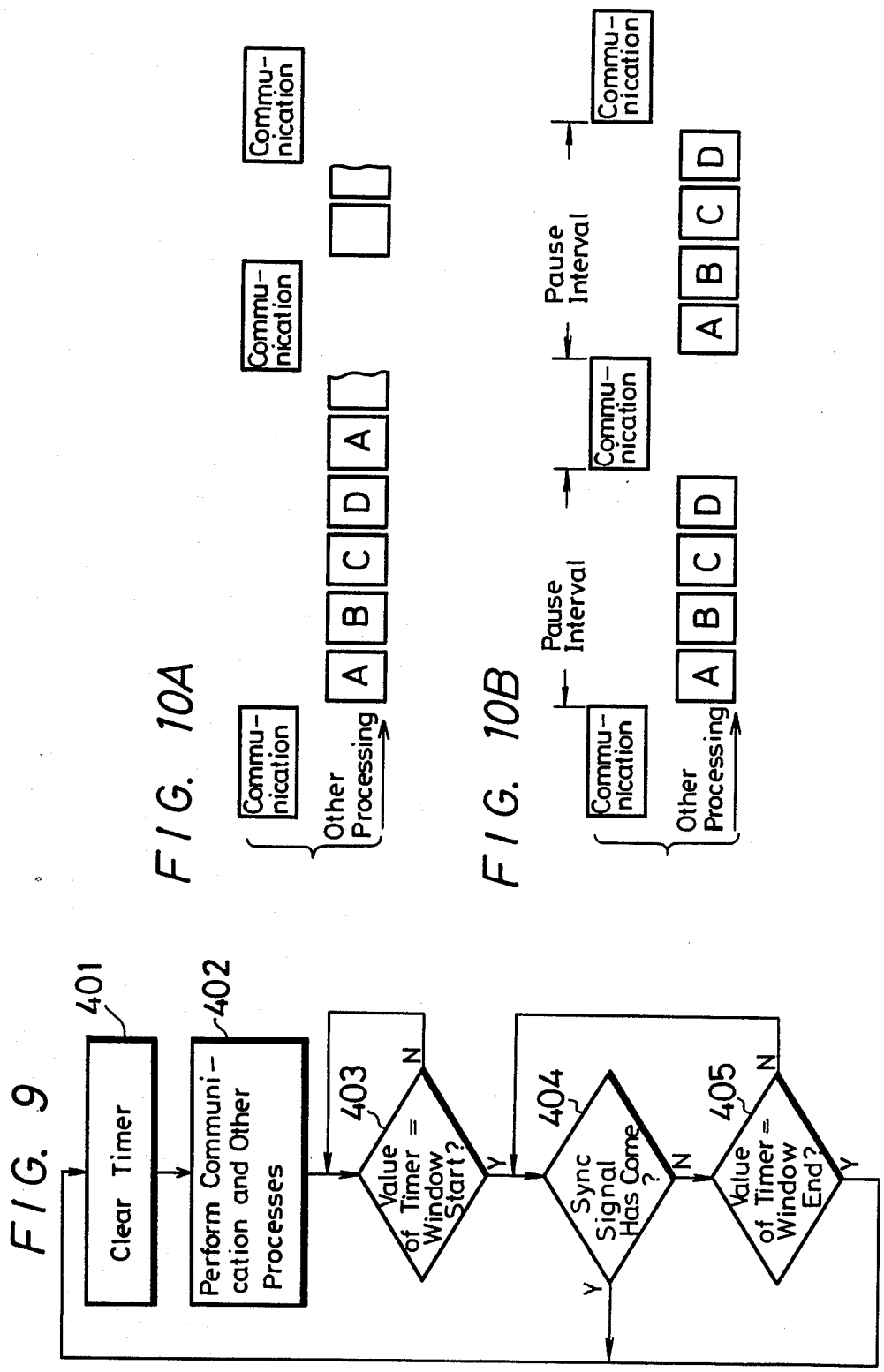

COMMUNICATION SYSTEM FOR VIDEO INFORMATION APPARATUS

BACKGROUND OF THE INVENTION

1. Field of the Invention

This invention relates to bidirectional communication between a single master apparatus and a plurality of slave apparatus and, more particularly but not exclusively, to a method and apparatus for communication between video information apparatus, such as VTR (video tape recorder) or video disc player, and peripheral apparatus, such as a tuner, a timer, a video camera, editing apparatus, a computer and so on.

2. Description of the Prior Art

Recently, in order to enhance the enjoyment of video equipment, a video information system has been developed, which comprises a VTR as master apparatus and a plurality of peripheral or slave apparatus, such as a camera, a television tuner unit, a timer unit and apparatus. In such a system, the communication of control data, such as a mode signal and various other control signals, between the VTR and each peripheral apparatus becomes a significant problem.

In a system for bidirectional communication between a VTR used as master apparatus and a plurality of peripheral apparatus each used as a slave apparatus, it is important that the number of communication lines be reduced as much as possible. This becomes increasingly important as the number of slave apparatus is increased.

A bidirectional communication system having at the side of the master apparatus only two communication lines one of which is a transmission communication line and the other of which is a reception communication line has much to recommend it. Alternatively, a bidirectional communication system having only one communication line may be employed.

The assignee of the present application has previously proposed a bidirectional communication system using only one communication line (see copending U.S. patent application Ser. No. 06/732,004, filed May 6, 1985, and assigned to the assignee of the present application).

In this previously proposed system, a communication interval formed of a plurality of master and slave transmission areas that are arranged in a time division manner is taken as one block, and this block is repeated cyclically. The time control for communication is provided exclusively by the master apparatus. The number of slave apparatus transmission areas is equal to the number of slave apparatus.

Even when two communication lines (master apparatus transmission line and slave apparatus transmission line) are used, seen from the side of the slave apparatus the transmission lines appear as one. Accordingly, when the communication is carried out cyclically as described above, the transmissions from the several slave apparatus are effected in the respective transmission areas in a time division manner.

However, since transmission areas are provided for all of the plurality of slave apparatus in a time division manner, as the number of slave apparatus increases, the total transmission period becomes very long.

Since each slave apparatus does not always request the master apparatus to transmit video information, if a transmission area is provided for each of the plurality of slave apparatus as described above, an unoccupied or useless transmission area occurs, resulting in low time efficiency.

On the other hand, it frequently happens that a mode signal, a control signal and a command signal are communicated between the video information apparatus and the peripheral apparatus, for example, between the VTR and the video camera and the editinq apparatus, in order that the two apparatus may be operated in synchronism with each other.

In the prior art, a communication of this kind is performed regardless of its time relation to an input signal or a reproduced video signal. For example, when a mode is changed, commands such as "playback mode next", "stop mode next" and so on are transmitted and received.

Particularly, when a communication is carried out only in a necessary case, as when the mode is changed as described above, if a miscommunication or erroneous communication occurs, the present mode remains erroneous at least until the next communication is made for changing the mode.

Further, since it is not known in advance exactly when the transmission data will arrive at the peripheral apparatus, the peripheral apparatus must be always in an interruptible state and always in a communicable state, so that the software therefor is difficult to write.

As to the video information apparatus, since it is not known in advance exactly when the command or the like will arrive from the peripheral apparatus, the software therefor is also difficult to write.

For this reason, it may be concluded that the communication should be carried out cyclically. However, if the cycle or period is free-running and not synchronized with a video signal or in a fixed time relation to the latter, various problems occur.

For example, it has recently been proposed that data such as a time code including a frame number, a field number and the like be multiplexed on a video signal and then recorded. In such case, when the time codes are communicated, if the communication between the VTR and the peripheral apparatus is carried out over a period longer than, for example, the vertical period, the communication surpasses the frame number or field number of the time code at a certain time, producing a dropout in the time code output.

Furthermore, if the period of the communication is not synchronized with the video signal, when the command (for example) "set recording mode two fields from now" is issued in a communication between the VTR and the editing apparatus, the time "two fields from now" cannot be determined uniquely. This makes the software therefor very difficult to write.

OBJECTS AND SUMMARY OF THE INVENTION

An object of this invention is to provide a bidirectional digital communication system for video information apparatus that overcomes the problems of conventional apparatus noted above.

Another object of the invention is to provide a communication system for video information apparatus in which time division multiplexing can be easily controlled by an inexpensive microcomputer.

Another object of the invention is to provide a communication system in which the number of time division areas can be less than the number of slave apparatus and in which the number of unused time division areas can be reduced, thereby improving time efficiency.

Another object of the invention is to provide a communication system for video information apparatus in which, when communication is carried out during a constant period or vertical period, the communication interval can be prevented from becoming too long. This provides free time during a step interval that can be employed to perform functions other than communication.

Another object of the invention is to provide a communication system for video information apparatus that can transmit communication data signals such as a frame number signal and so on corresponding to the frame number, field number or the like.

Another object of the invention is to provide a communication system for video information apparatus in which, since the time for starting a communication can be predicted, the hardware of the peripheral apparatus and of the master apparatus can be simplified.

Another object of the invention is to provide a communication system for video information in which, since the communication is carried out in synchronism with the vertical period, it can easily be determined whether or not noise is mixed into a picture by the communication, thereby reducing the debugging period.

The foregoing and other objects of the invention are attained, according to one aspect thereof, by the provision of a system for communicating between master video apparatus and peripheral apparatus wherein video signals organized into vertical periods are processed; the apparatus comprising: means for generating timing signals synchronously with the vertical periods; means for establishing first communication intervals having a substantially constant phase relation with respect to the timing signals; and communication means for effecting communication between the master apparatus and the peripheral apparatus during the first communication intervals.

According to another aspect of the invention, there is provided a data communication method for communicating serial data between a master apparatus and a plurality of slave apparatus in a bidirectional manner comprising the steps of: repeating cyclically a communication interval formed of a plurality of separate communication areas, the number of areas being less than the number of the slave apparatus; reserving first selected ones of the areas for transmission by the master apparatus and second selected ones of the areas for transmission by the slave apparatus; and respectively allocating the second areas to individual ones of the slave apparatus on a first-come, first-served basis.

BRIEF DESCRIPTION OF THE DRAWINGS

A better understanding of these and other objects, features and advantages of the present invention will become apparent from the following detailed description of the preferred embodiment thereof in conjunction with the accompanying drawings, wherein like reference characters designate like elements and parts and wherein:

FIGS. 3A (formed of FIGS. 3A-I and 3A-II) to 3K (formed of FIGS. 3K-I and 3K-II) are diagrams used to explain the transmission and reception, respectively, in one communication interval;

FIGS. 8A and 8B are diagrams used to explain how to cope with the disorder of a vertical synchronizing signal;

FIG. 9 is a flow chart helpful for explaining the operations of FIGS. 8A and 8B; and FIGS. 10A and 10B are respectively diagrams used to explain examples of other communication modes, such as when a communication is carried out in the midst of one operation, so that other operations cannot be performed and when a time division multiplexing process can be controlled easily.

DESCRIPTION OF THE PREFERRED EMBODIMENT

Now, the present invention will hereinafter be described with reference to the attached drawings.

Figure 1:
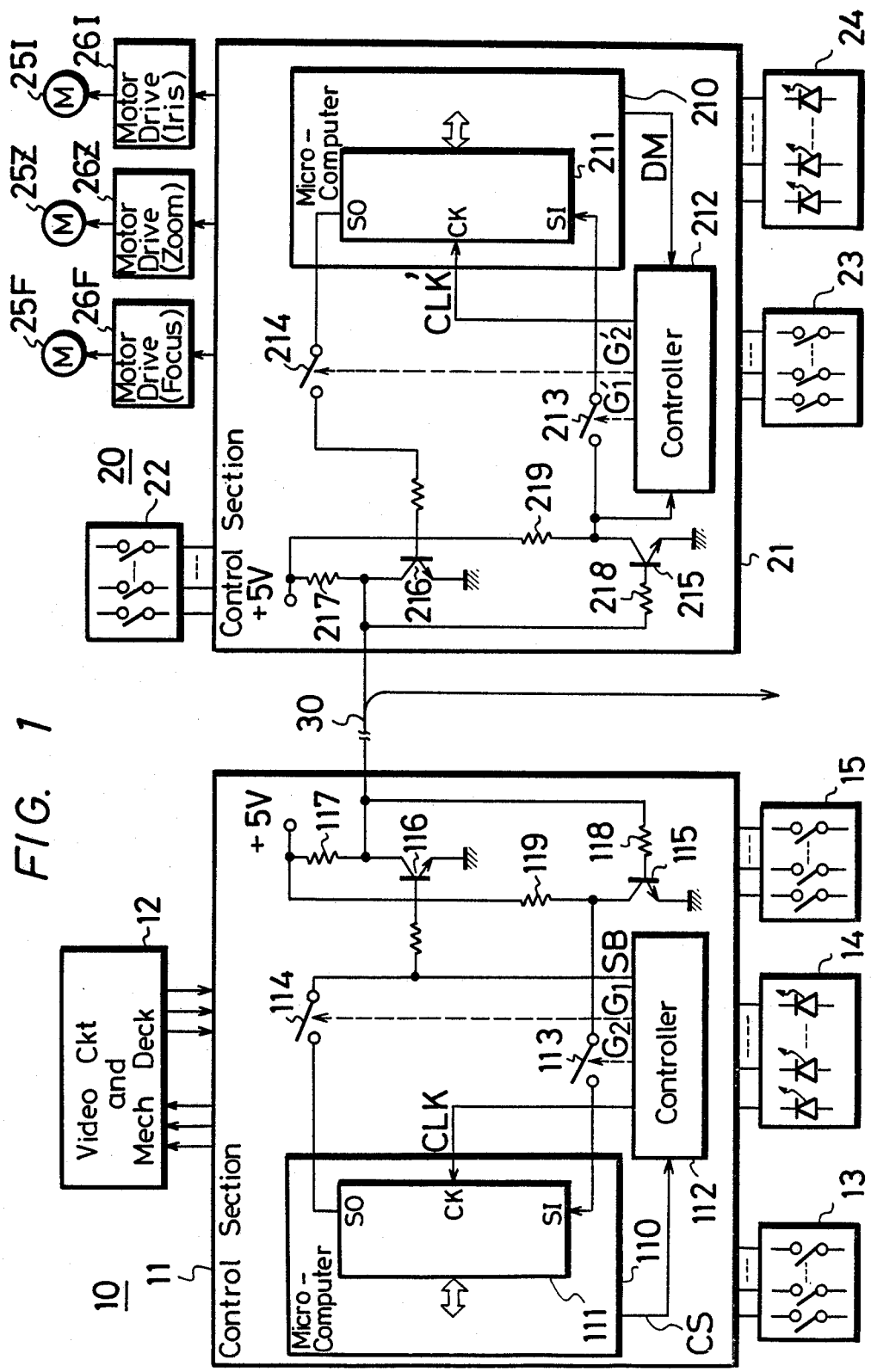
FIG. 1 is a block diagram of a communication system (including a VTR used as master apparatus and a video camera used as a slave apparatus) to which an embodiment of a communication method and apparatus according to this invention is applied.

FIG. 1 is a block diagram showing an example of a communication system to which an embodiment of a bidirectional data communication method and apparatus according to the present invention is applied. In this example, the bidirectional serial data communication is made possible by a single communication line. A VTR 10 (video tape recorder) is used as the master apparatus, and more than three slave apparatus such as a video camera 20, a television tuner unit and an editing apparatus (neither of the latter two being shown) are used. Since the structure of the communication control sections at the various slave apparatus are all the same, only the video camera 20 is shown in the example of FIG. 1.

A data communication line 30 transmits control data between the VTR 10 and the video camera 20 and other slave apparatus.

The VTR 10 comprises a control section 11 which incorporates therein a microcomputer 110 to carry out the communication control and other controls, a video circuit and mechanical deck section 12, a VTR function key section 13, a VTR mode display section 14, a remote control function key section 15 for the video camera 20 and so on.

The video camera 20 comprises a control section 21 which incorporates a microcomputer 210 to carry out a communication control and other controls, a camera function key section 22, a remote control function key section 23 for the VTR 10, a display section 24 which can display data within, for example, a finder of the video camera 20 and so on. Further, motors 25F and 25Z for respectively rotating a focusing ring and a zoom ring of an image pickup lens and an iris motor 25I for controlling the opening and closing of the iris are respectively connected through motor drive circuits 26F, 26Z and 26I to the control section 21.

The function key section 13 of the VTR 10 includes function keys for placing the apparatus in any of various modes, such as a recording mode, playback mode, pause mode, fast forward mode, rewind mode, stop mode and so on. When one of these function keys is depressed, the microcomputer 110 of the control section 11 identifies the depression of the function key and displays it on the display section 14. At the same time, the microcomputer 110 supplies a necessary control signal to the video circuit and mechanical deck section 12 so as to place the VTR in the mode corresponding to the mode of the operated function key.

Also the remote control function key section 23 for the VTR 10 at the video camera 20 includes function keys corresponding to various modes, such as recording mode, playback mode, pause mode, fast forward mode, rewind mode, stop mode and so on. When one of these function keys is depressed, as described below, control data is transmitted to the VTR 10 from the video camera 20 through the communication line 30. Such control data is latched in the register of the microcomputer 110 in the control section 11 and then the mode of the VTR 10 is determined from the content of the control data and the state of the key input of the function key section 13 of the VTR 10 at that time. The corresponding mode is displayed on the display section 14 and the appropriate control signal is supplied to the video circuit and the mechanical deck section 12, thus placing the VTR 10 in the corresponding mode. The reason the mode of the VTR 10 is determined on the basis of the data transmitted from the video camera 20 and the state of the function key section 13 of the VTR 10 is to prevent any erroneous operation. For instance, the case wherein the video camera 20 is placed in the recording mode while the VTR 10 is placed in the fast forward mode is not normal; in such a case, therefore, a fast forward command would be neglected and the recording mode would be continued. The correct operation is realized since the manner in which the future mode of the VTR 10 is selected in accordance with the combination of the remote control signal and the function key mode is stored in the microcomputer 110.

The signal data indicating that the VTR 10 is placed in the corresponding mode is then transmitted from the VTR 10 to the video camera 20. The signal data is received by the video camera 20, and the mode of the VTR 10 is displayed on the display section 24 within the view finder.

The remote control function key section 15 for the video camera 20 of the VTR 10 includes keys such as a focus key, iris key, zoom key, pan key, tilt key and so on. For example, when the zoom is operated, as will be described later, zooming data is transmitted to the video camera 20 from the VTR 10 through the transmission line 30 and stored in the register of the microcomputer 210 of the control section 21 in the video camera 20. Then, the zooming data is supplied to the zoom motor 25Z through the motor drive circuit 26Z, so that the zooming operation is carried out.

If the function key section 22 in the video camera 20 is operated, the camera 20 carries out the operation corresponding to the key operation in response to the signal from the microcomputer 210 of the control section 21. If, for instance, the zoom key of the video camera 20 is operated, the zooming operation will be carried out.

The control section 11 of the VTR 10 and the control section 21 of the video camera 20 are constructed as described below. The control section 21 is constructed in exactly the same way in the other slave apparatus.

The microcomputer 110 in the control section 11 of the VTR 10 and the microcomputer 210 in the control section 21 of the video camera 20 include 8-bit shift registers 111 and 211, respectively. Each of the shift registers 111 and 211 includes a serial input terminal SI, a serial output terminal SO and a clock terminal CK. The writing and reading of data into and from the shift registers 111 and 211 are carried out in the form of parallel data for the data buses of the microcomputers.

The writing and reading of the serial data into and from the shift registers 111 and 211 are controlled by communication controllers 112 and 212, respectively. The communication controllers 112 and 212 generate signals $G_1$, $G_2$ and $G_1'$, $G_2'$ which control input gate switches 113, 213 and output gate switches 114, 214 to turn on and off and shift clocks CLK and CLK' (one cycle thereof is, for example, 104 $\mu$sec) for the shift registers 111 and 211.

The communication controller 112 provided in the VTR 10, which is used as the master apparatus, is adapted to generate a start bit on the basis of a communication start signal CS transmitted from the microcomputer 110; on the other hand, the communication controller 212 in the video camera 20, which is used as slave apparatus, does not produce the start bit. In other words, the time control for the communication is carried out only by the VTR 10, which functions as the master apparatus Microcomputers can be employed as the communication controllers 112 and 212.

Transistors 115 and 215 are input transistors, while transistors 116 and 216 are output transistors. The collectors of the output transistors 116 and 216 are connected through resistors 117 and 217, respectively, to power supply terminals of +5 V. The same collectors are further connected to the communication line 30. The emitters of the respective transistors 116 and 216 are grounded. The serial data from the shift registers 111 and 211 are supplied through the output switches 114 and 214 to the bases of the output transistors 116 and 216, respectively.

The communication line 30 is connected through resistors 118 and 218 to the bases of the input transistors 115 and 215. The emitters of the input transistors 115 and 215 are grounded and the collectors thereof are connected through resistors 119 and 219, respectively, to the power terminals of +5 V. The collectors of the input transistors 115 and 215 are further respectively connected through input switches 113 and 213 to the serial input terminals SI of the shift registers 111 and 211.

Accordingly, when data is not being transmitted through the communication line 30, the line 30, since connected to the power supply terminals (+5 V) via the resistors 117 and 217, is maintained at a level as high as +5 V.

Figure 2:
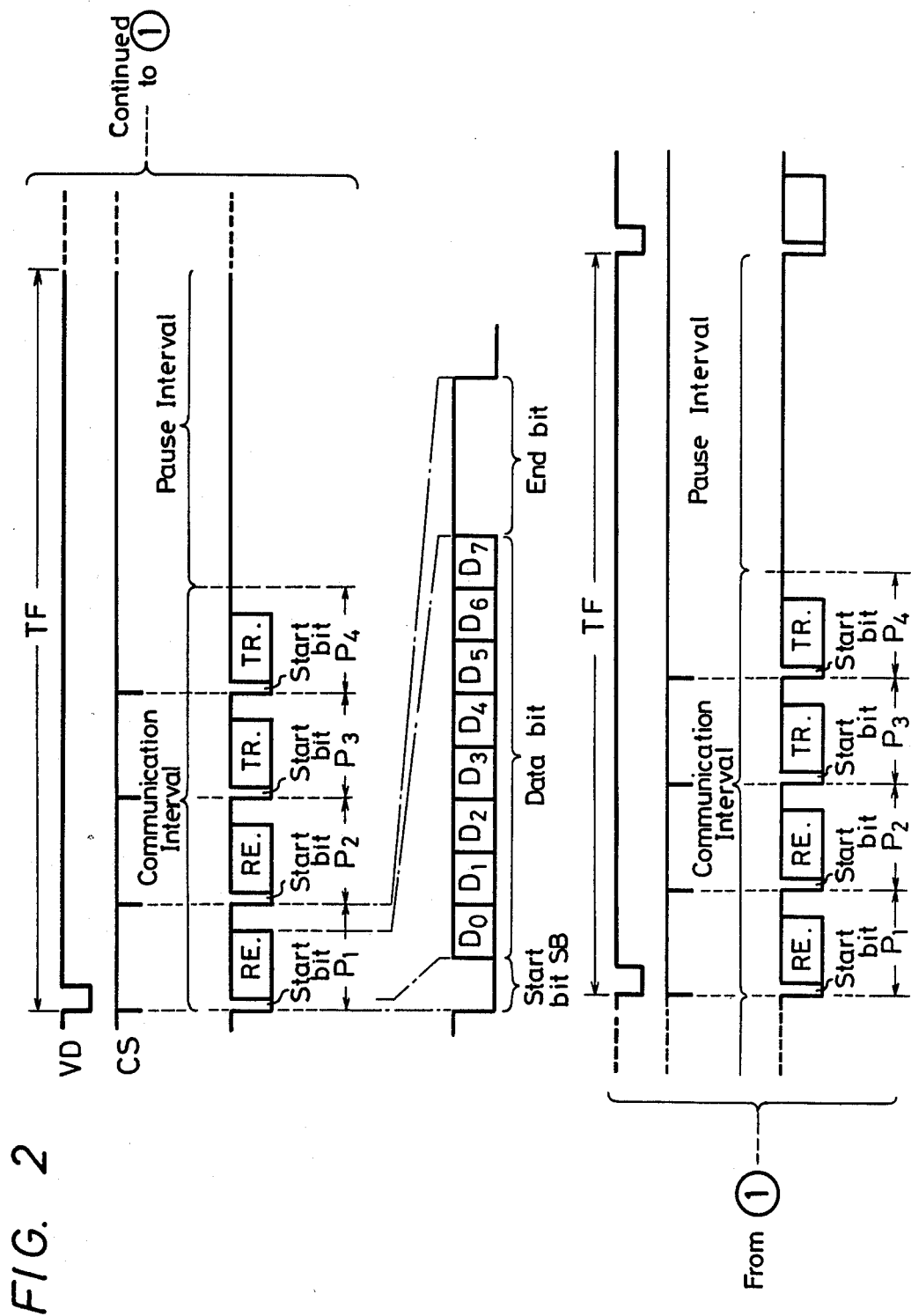
FIG. 2 is a diagram useful for explaining a bidirectional communication carried out between the VTR and video camera shown in FIG. 1.

In the arrangement described above, the bidirectional communication between the VTR 10 as the master apparatus and the video camera 20 as the slave apparatus is carried out in synchronism with the vertical synchronizing signal VD shown in FIG. 2.

More specifically, in the VTR 10 as the master apparatus, an interval formed of two receiving areas (transmitting areas of the slave apparatus) $P_1$ and $P_2$ and two transmitting areas (receiving areas of the slave apparatus) $P_3$ and $P_4$ is treated as one communication interval. This communication interval and a pause interval of a constant period are repeatedly transmitted in synchronism with the vertical synchronizing signal VD as shown in FIG. 2. There are thus two transmission areas $P_1$ and $P_2$ for the slave apparatus, so that there are fewer slave apparatus transmission areas than there are slave stations. The transmissions from the slave apparatus are carried out by using a vacant one of the areas $P_1$ and $P_2$ as described below.

One bit at the beginning of each of the areas $P_1$, $P_2$, $P_3$ and $P_4$ is reserved for a start bit, which is produced only by the VTR 10 that is used as the master apparatus and by which the reception and the transmission between the master apparatus and the slave apparatus can be carried out. That is, the communication controller 112 produces four start bits SB in one communication interval during each cycle.

Serial data $D_0$ to $D_7$ of 8 bits are transmitted in each of the transmission and receiving areas $P_1$ to $P_4$ and the data $D_0$ to $D_7$ of 8 bits constitute one word. Since one communication interval is formed of four communication areas $P_1$ to $P_4$, four data words are received and transmitted during one vertical period TF. The word number and the bit number within the communication interval are made constant so that the length of the communication interval becomes constant. Thus the length of the pause interval is also constant.

The transmission and reception within one communication interval is carried out as follows. First the transmission from the master apparatus will be described. While in FIG. 2 transmission from the master apparatus is carried out after the transmission from the slave apparatus is carried out, the sequential order of the transmission and the reception does not cause any problems if it is determined in advance.

The microcomputer 110 of the master apparatus generates a communication start signal CS (shown in FIG. 3A) which is then supplied to the communication controller 112. The communication start signal CS is normally "1" and falls off to "0" when the communication start request is generated. In this embodiment, the communication start signal CS falls to "0" four times during one vertical period TF. When the communication start request is generated, the communication controller 112 produces the start bit SB (shown in FIG. B) that becomes "1" during a period of one bit or predetermined duration of time equal, for example, to 104 μsec. The period during which the start bit SB is high begins when the communication start signal becomes low. This start bit SB is supplied to the base of the output transistor 116 and then is supplied to the communication line 30 which is connected with the collector of the output transistor 116 as a signal "0" whose polarity is inverted.

The communication controller 112 generates 8 clock pulses CLK (shown in FIG. 3C) having a clock cycle or pulse period equal to 104 μsec. The first of the 8 pulses commences at a time coincident with the falling edge of he start bit SB. These pulses CLK are supplied to the clock terminal CK of the shift register 111. The control signal $G_1$ (shown in FIG. 3D) for the output switch 114 becomes "1" during the period of 8 clock pulses CLK, and the output transistor 114 is turned on during this period of "1". Since transmission data $DT_1$ (shown in FIG. 3F) is already stored in the shift register 111 by the microcomputer 110 the 8-bit transmission data $DT_1$ is read out from the shift register 111 by the 8 clock pulses CLK and then is supplied through the output switch 114 and the output transistor 116 to the communication line 30. FIG. 3G shows the state of the signal on the communication line 30.

When the 8-bit transmission data $DT_1$ is transmitted, the output witch 114 is turned off so that the communication line 30 is pulled up to "1". The period of "1" lasts for a time equal to the duration of 2.5 to 5 bits, and the period of 2.5 to 5 bits constitutes an end bit (refer to FIGS. 2 and 3G). Such end bits are usually selected to be about two normal bits in duration. In this embodiment, however, in order to afford sufficient time for the microcomputer to perform all operations specified by the software, including latching and/or storing the communication data in a RAM (random access memory) of the microcomputer, the stop bit is extended so that it is longer than a normal bit.

The data transmitted from the master apparatus in the transmission area as mentioned above is supplied to, for example, the base of the input transistor 215 provided in the slave apparatus such as the video camera 20. The input transistor 215 is turned off at the start bit SB so that the collector output rises to "1". The communication controller 212 detects this condition, and the control signal $G_1'$ (FIG. 3I) for the input switch 213 rises to "1" and 8 clock pulses CLK' (FIG. 3K) each having a cycle 104 μsec in length are produced, whereby the input switch 213 is turned on and the clock pulse CLK' is supplied to the clock terminal CK of the shift register 211. As a result, the transmission data $DT_1$ from the VTR 10 is latched in the shift register 211. The data latched in the shift register 211 is then transmitted to and stored in the RAM (not shown) of the microcomputer 210 during the stop bit period, and data $DT_2$, which is to be transmitted from the video camera 20 to the VTR 10, is set in the shift register 211.

Although the data $DT_1$ is latched in other slave apparatus simultaneously, whether or not the other slave apparatus use the data $DT_1$ is determined by their microcomputers by interpreting the content of the data $DT_1$.

The receiving area for the master apparatus, or the transmission from the slave apparatus will be described next.

When the video camera 20 issues the transmission command and a transmission demand signal DM (FIG. 1) is supplied to the communication controller 212, the video camera 20 is set in a transmission standby mode and the transmission data $DT_2$ (the right-hand side of FIG. 3H) is stored in the shift register 211.

Under this state, the start bit SB (FIG. 3B) is generated by the communication controller 112 of the VTR 10 at the beginning of the area $P_1$ (FIG. 2) and the start bit SB is transmitted through the transistor 116 (FIG. 1) and the communication line 30 to the video camera 20. Then, as shown in the right-hand side of FIG. 3G, the data on the transmission line 30 becomes "0" during one bit period. As a result, the input transistor 215 of the video camera 20 is turned off and the collector output thereof becomes "1". Since the communication controller 212 detects this condition and the control signal $G_2'$ (FIG. 3J) for the output switch 214 becomes "1", the output switch 214 is turned on and the 8 clock pulses CLK' are generated during the period in which the signal $G_2'$ is "1". The 8 clock pulses CLK' are fed to the clock terminal CK of the shift register 211. Consequently, the data $DT_2$ is read out from the shift register 211 (refer to FIG. 3H) and is fed through the output transistor 216 to the communication line 30.

After the start bit SB is generated by the communication controller 112 of the VTR 10, the control signal $G_2$ (FIG. 3E) for the input switch 113 becomes "1" so that the input switch 113 is turned on and the 8 clock pulses CLK (FIG. 3C) are generated during the period in which the signal $G_2$ becomes "1".

Accordingly, the data $DT_2$ transmitted from the video camera 20 is supplied through the input transistor 115 and the switch 113 to the shift register 111 and stored in the shift register 111 on the basis of the clock pulse CLK.

The data $DT_2$ is then transferred to and stored in the RAM of the microcomputer 110 during the end bit period of the transmission area $P_1$.

In the case described above the first area $P_1$ in the communication interval is not used as a transmission area by other slave apparatus. Interference between two slave apparatus competing to use the same transmission area is avoided by causing one of the slave apparatus to transmit in the next area $P_2$. In other words, certain transmission areas are reserved for transmissions made by the various slave apparatus, and these areas are respectively allocated to individual ones of the slave apparatus on a first-come, first-served basis.

Figure 4:
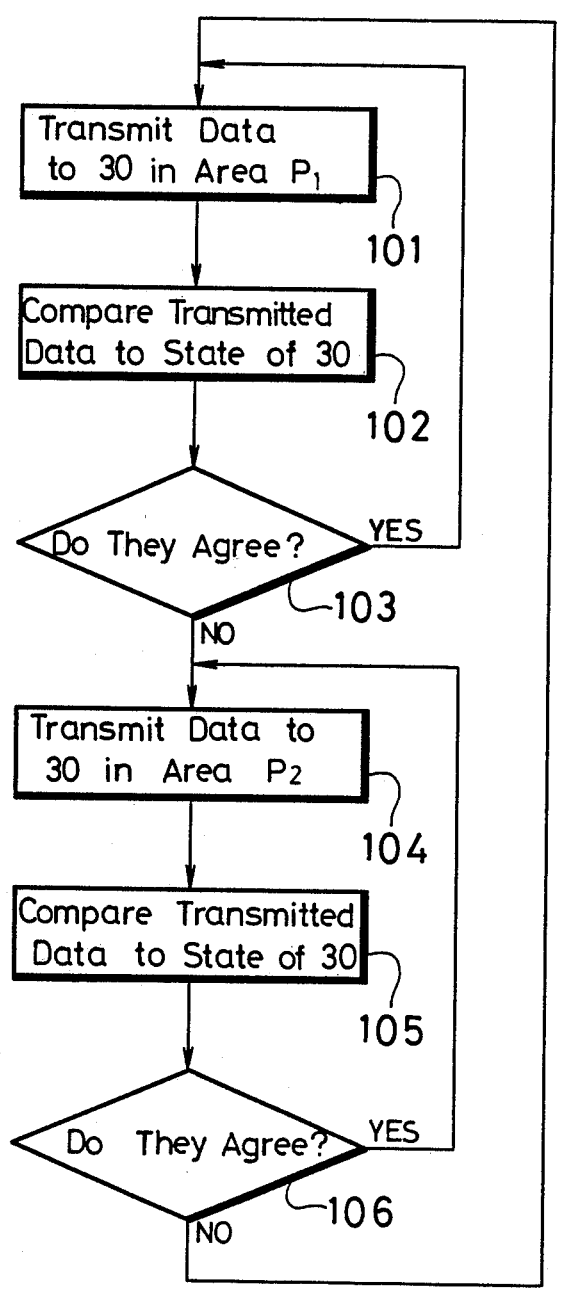
FIG. 4 is a flow chart useful for explaining the operation carried out by slave apparatus to determine an unoccupied transmission area within which to transmit.

FIG. 4 is a flow chart representing a program used for such purpose. The program routines conforming with the flow chart of FIG. 4 are executed by the microcomputer of the control section of each slave apparatus.

When the start bit SB is transmitted from the master apparatus to each slave apparatus at the beginning of the area $P_1$, the slave apparatus having the transmission request command transmits the transmission data to the communication line 30 (step 101) in the transmission area $P_1$. At that time, the state of the data transmitted to the communication line 30 and the stat of the communication line 30 are compared at every bit (step 102). More specifically, if the transmission data is "0", the output transistor 216 is in the off state so that the communication line 30 must be placed in the state of 5 V, while if the transmitted data is "1", the output transistor 216 is turned on so that the communication line 30 must be placed in the state of OV.

However, when data are transmitted from a plurality of slave apparatus, if the data bit from any one of the slave apparatus becomes "1", since its output transistor 216 is turned on, the communication line 30 is lowered to 0 V regardless of the data of other slave apparatus. Accordingly, when the communication line 30 becomes 0 V while the bit of the transmitted data is "0", an inconsistency exists between the data as transmitted and the data as monitored on the communication line 30. This inconsistency is detected by the microcomputer of the control section of the slave apparatus (step 103) and signifies the simultaneous transmission by other slave apparatus through the same area $P_1$. From the preceding description, it is apparent that when two or more slave apparatus simultaneously transmit data through the same transmission area, the slave apparatus whose transmission data bi $D_0$ to $D_7$ transmits "1" first is given priority and the corresponding area is assigned as the transmission area of that slave apparatus. Then, in the slave apparatus in which it is detected that the data as transmitted and the data on the communication line 30 are different from each other at a given bit, the succeeding bits are all set to "0", whereby to prevent the data of the slave apparatus preempting the area $P_1$ from being transmitted incorrectly.

The slave apparatus which could not transmit data through the area $P_1$ again transmits data on the basis of the start bit SB which occurs at the beginning of the area $P_2$ (step 104). A determination whether or not the area $P_2$ is vacant is made in the same way as earlier noted at steps 105 and 106. If the area $P_2$ is vacant, it is selected as the transmission area of that slave apparatus. If on the other hand it is occupied, a determination whether or not the area $P_1$ is vacant described above is made again in the next cycle. The operation described above is repeatedly carried out until a vacant area is detected.

Figure 5:
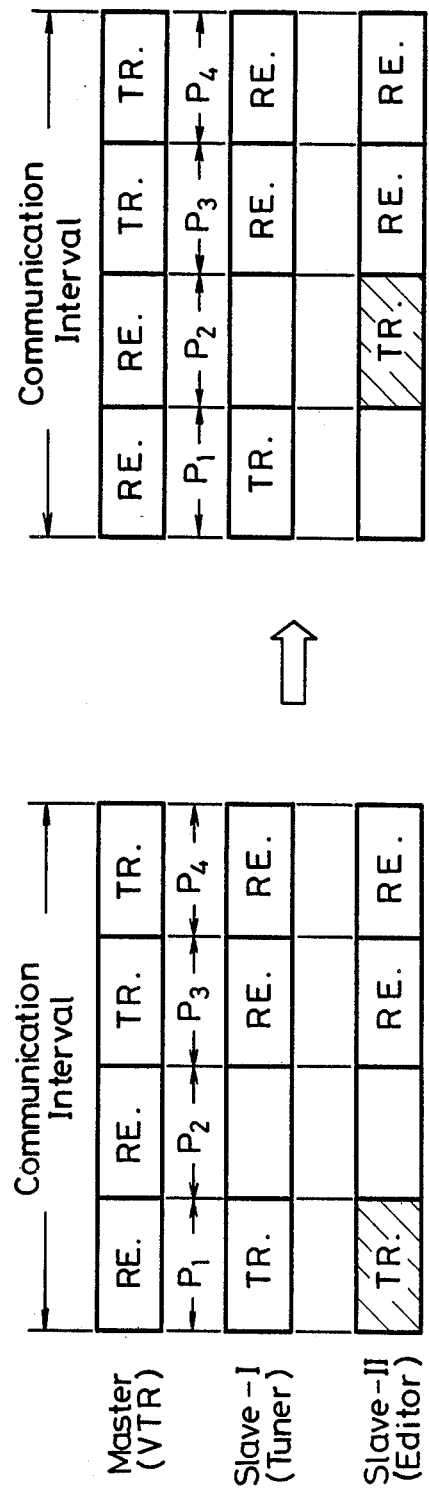
FIG. 5 is a diagram schematically illustrating the operation of the flow chart of FIG. 4.

FIG. 5 schematically illustrates these operations. In FIG. 5, a slave apparatus I (for example, a tuner) and another slave apparatus II (for example, an editing apparatus) compete with each other with respect to the transmission demand in the area $P_1$ and the editing apparatus as the slave apparatus II transmission switches into the area $P_2$. The master apparatus (VTR) receives in areas $P_1$ and $P_2$ and transmits in the areas $P_3$ and $P_4$ Both slave apparatus receive in areas $P_3$ and $P_4$. Both attempt to transmit in the area $P_1$ (left half of FIG. 5). The tuner preempts the area $P_1$ and the editor then switches to the area $P_2$ (right half of FIG. 5).

The checking of the area at every bit can be performed easily by the shift register 211, which is formed as a 9-bit shift register. In practice, since the shift register that the 4-bit microcomputer incorporates therein is of a 9-bit type, such shift register can be used without modification.

During the pause or stop interval next following the communication interval formed of the four areas $P_1$ to $P_4$, the data processing based on the content of the received data is carried out by the VTR 10, the video camera 20 and other slave apparatus, and other processing is carried out in a time division manner.

As described below, the communication interval including the transmission from the VTR 10 and the transmission from the slave apparatus such as the video camera 20 and the like into one block is repeated cyclically, the pause interval being interposed therein. In this embodiment, since the start bit SB is generated only by the master apparatus and the time control is carried out by the master apparatus, the areas $P_1$ to $P_4$ can be discriminated surely and the communication interval and the pause interval can be reliably distinguished from each other.

These operations are executed in accordance with the following program routines of the microcomputers of the VTR 10 and the video camera 20.

Figure 6:
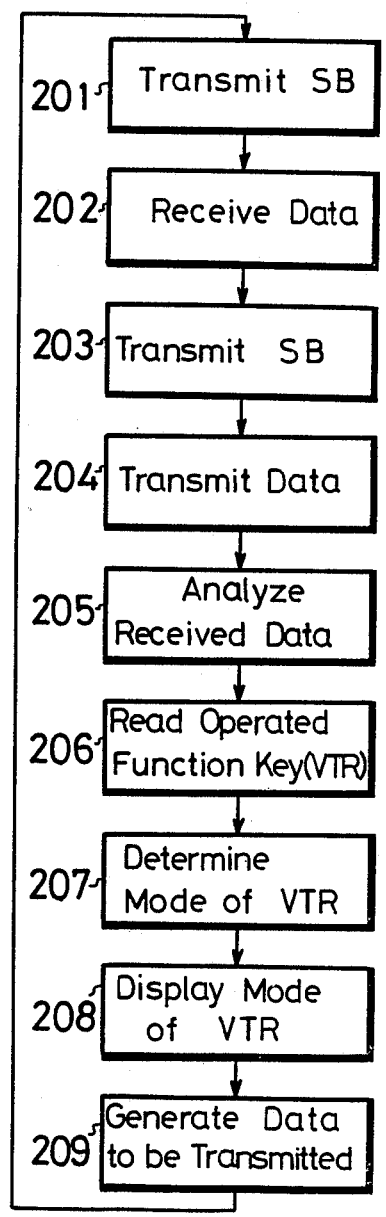
FIG. 6 is a flow chart of a program used by the VTR.

FIG. 6 is a flow chart: of the program steps for the VTR 10, in which steps 201 to 209 are executed sequentially and repeatedly. In steps 205 to 207, either the command from the video camera 20 or the function key operation of the VTR 10 is given priority, whereby the mode of the VTR 10 is determined These steps 205 to 207 are used to prevent erroneous operation.

In step 209, data corresponding to the key operation at the VTR 10 and data indicative of the mode of the VTR 10 designated by the remote control signal from the video camera 20 are generated; and data indicative of "no operation to be performed" is generated when there are no command and no mode to be transmitted to the video camera 20.

More particularly, at step 201, the start SB is transmitted by the VTR 10 (master apparatus). At step 202, data is received. At step 203, the start bit SB is transmitted. At step 204, data is transmitted. At step 205, the received data is analyzed. At step 206, the operated function key of the VTR 10 is read. At step 207, the mode of the VTR 10 is determined. At step 208, the mode of the VTR 10 is displayed. At step 209, the data to be transmitted is generated The program then recycles to step 201.

Figure 7:
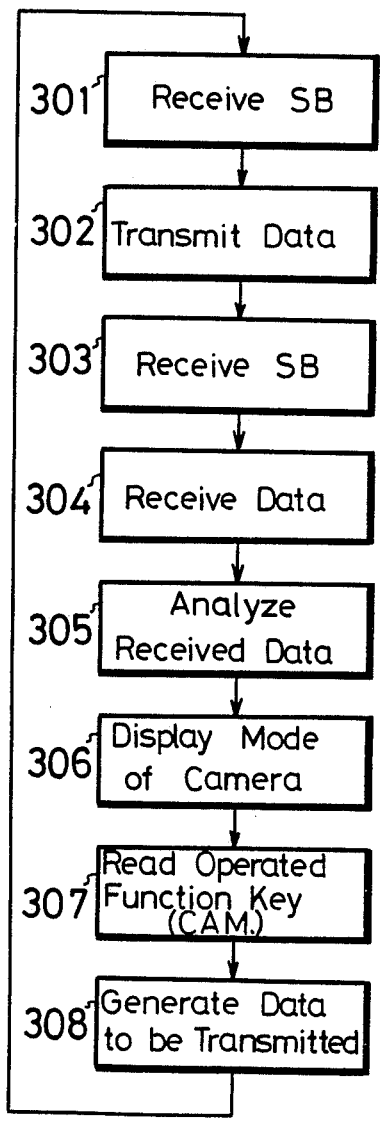
FIG. 7 is a flow chart of a program used by the video camera.

FIG. 7 is a flow chart of the program routine for the video camera 20, in which steps 301 to 308 are executed sequentially and repeatedly. In step 308, the transmission data is generated and stored in the register and the video camera 20 is set in the standby mode until the start bit is received. The transmission data is transmitted at step 304.

More particularly, at step 301, the start SB is received by the video camera 20 (slave apparatus). At step 302, data is transmitted. At step 303, the start bit SB is received. At step 304, data is received. At step 305, the received data is analyzed. At step 306, the mode of the camera 20 is displayed. At step 307, the operated function key of the camera 20 is read. At step 308, the data to be transmitted is generated. The program then recycles to step 301.

The generation of the start bit and of the clock pulse in the communication controller 112 and the detection of the start bit and the generation of the clock pulse in the communication controller 212 may be carried out under the control of the microcomputers 110 and 210, respectively, or by other hardware, as those skilled in the art will understand.

The communication is carried out in synchronism with the vertical sync signal VD as described above. When an artificial sync signal is mixed into the vertical sync signal VD or the television channel is changed by the television tuner, the period of vertical sync signal is disordered temporarily. If the communication responds to the disorder of the vertical sync signal, the communication may be interrupted, or malfunctions may occur in processes or operations other than the communication.

Therefore, the following operations are performed so as to cope with the disorder of the vertical synchronizing signal.

The following data processing is executed by the software program of the microcomputer 110 of the VTR 10 that is used as the master apparatus for communication.

The VTR 10 is set in the standby mode, in which it is momentarily inoperative, after a period S that begins at the leading edge of the vertical sync signal VD (FIG. 8A) and that is selected so that TF>S. The period S may be, for example, 15 msec (see FIG. 8B). More specifically, the communication interval begins at the leading edge of the vertical sync signal VD, and the pause or stop interval, in which operations other than communication are performed, begins at the end of the period S. These other operations are interrupted until the time S is passed from the leading edge of the vertical sync signal VD. The normal complete cycle is 16.7 msec.

Figure 8B:
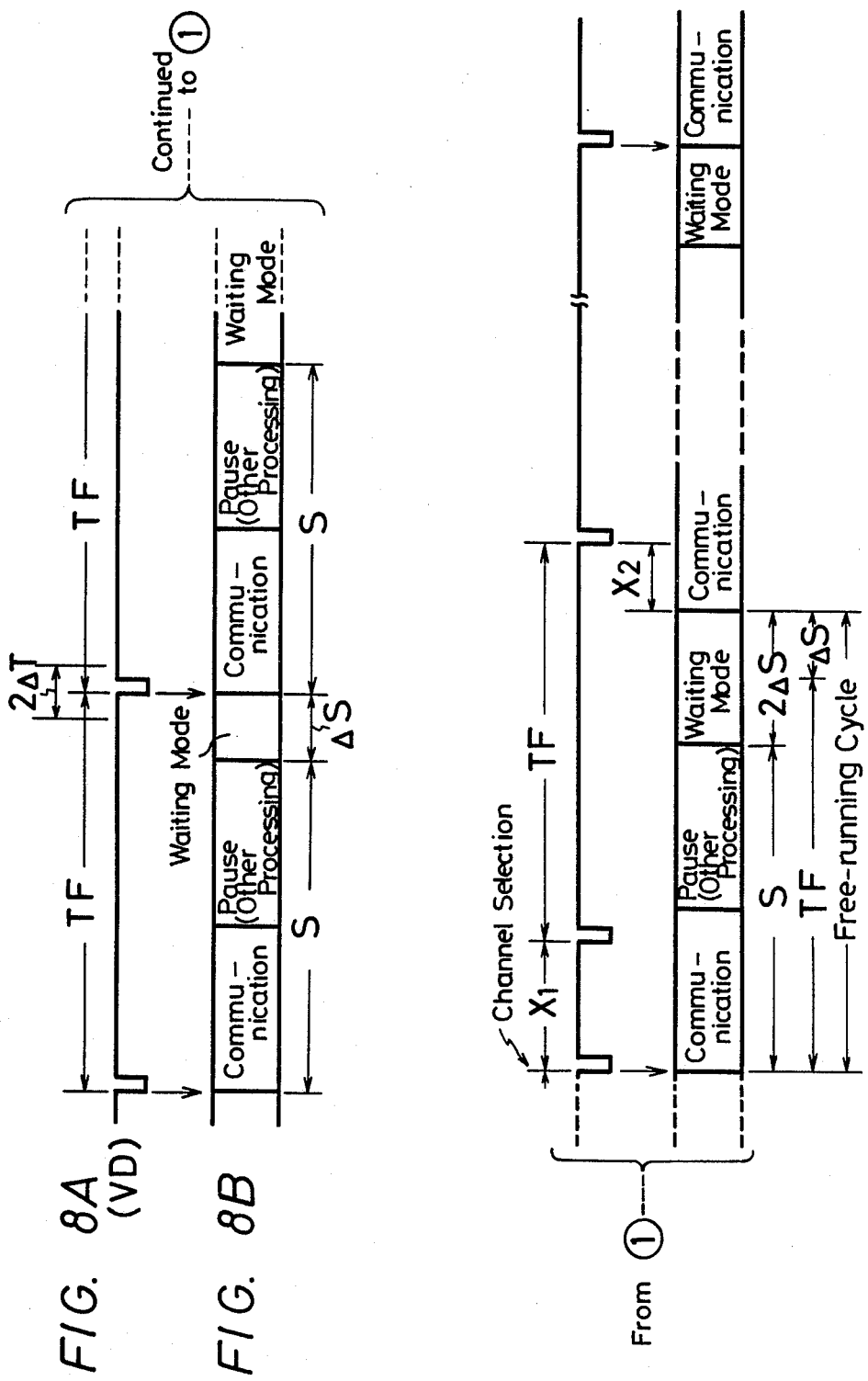

The vertical sync signal VD is not disordered, if the following vertical sync signal VD arrives at the end of the time TF, whereby the VTR 10 is released from its waiting mode and the communication begins (see FIG. 8B). This operation is repeated indefinitely.

Generally, if the maximum waiting interval is taken as 2ΔS, the waiting mode is released at the midpoint thereof. That is, TF=S+ΔS is approximately established Theoretically, TF is a constant (16.66 . . . msec=1/60 sec), but actually it contains a periodic error ΔT, as discussed below.

If the period of the vertical sync signal VD is disordered by channel selection and the like as shown in FIG. 8A, when the constant waiting period 2ΔS passes (FIG. 8B), the waiting mode is released and hence the communication begins If the vertical sync signal VD arrives before 3 msec passes (following the end of period S), the waiting mode is released upon its arrival; i.e., the waiting mode is released without waiting for the full 3 msec. Thus the VTR 10 is designed to follow the disorder of the period of the vertical sync signal VD if the time displacement of the vertical sync signal VD does not exceed ±ΔS. However, when the disorder of the period of the vertical sync signal VD is such that the time displacement thereof exceeds ±ΔS, the VTR 10 is not synchronized with the vertical sync signal VD for a certain time duration and the free-running cycle of duration S+2ΔS that is determined by the microcomputer 110 continues. Thereafter, when the vertical sync signal VD again enters into the waiting period of 2ΔS, communication is started in synchronism with the vertical sync signal VD.

That is, when the vertical sync signal VD is disordered, a window having a width of ±ΔS is provided for the vertical sync signal VD. Accordingly, disorder of the synchronization is known to exist when the vertical sync signal VD is outside this window. Then, until the vertical sync signal enters into the window, the communication is carried out at the free-running cycle of S+2ΔS. The time required by the VTR 10 to return to synchronization with the vertical sync signal VD is determined by the width 2ΔS of the window. In FIG. 8 two successive vertical sync signals VD are shown to occur with a period $X_1$ that deviates considerably from the norm. If the periodic error of the vertical sync signal VD is taken as ±ΔT where ΔS>ΔT and the displacement between the vertical sync signal VD and the communication cycle after the channel is changed is taken as $X_2$, the following equation results:

$$\begin{aligned}
X_2 &= (X_1 + TF \pm \Delta T) - (S + 2\Delta S) \\
&= X_1 - \{S + 2\Delta S - (TF \pm \Delta T)\} \\
&= X_1 - \{(S + \Delta S) - TF + (\Delta S \pm \Delta T)\} \\
&= X_1 - (\Delta S \pm \Delta T)(\text{thus } S + \Delta S = TF)
\end{aligned}$$

The displacement is thus reduced by (ΔS±ΔT) at every period and hence in the worst case the vertical sync signal VD again enters into the window after a period of $$N = \frac{X_1}{\Delta S - \Delta T},$$

and the VTR 10 is locked to the vertical sync signal VD. These operations are carried out in accordance with the flow chart of FIG. 9. At step 401, the timer is cleared. At step 402, communication and other processes are carried out. At step 403, a determination is made whether or not the value registered by the timer has reached the starting point of the window. The determination is made repeatedly until the answer is yes. At step 404 a determination is made whether or not the sync signal has arrived. If so the program loops back to step 401. If not a determination is made at step 405 whether or not the value registered by the timer has reached the end point of the window. As long as the end point of the window has not been reached, the program loops back to step 404; when the end point of the window is reached, the program loops back to step 401.

As described above, when a PLL circuit is constructed by the software of the microcomputer, the communication can be carried out in synchronism with the vertical sync signal VD.

Accordingly, if the vertical sync signal VD is the synchronization, free-running synchronization is established by the PLL circuit provided by the software of the microcomputer so that interruption of communication is prevented and the communication therefore follows the vertical sync signal VD.

Since the processing time for transmission an reception is provided by making the length of the end bit longer than the norm, the serial data can be read out and written easily by the software. In addition, with respect to the hardware, there is the advantage than an extra latch circuit is not required.

Further, this system is an excellent match for the RS-232C that is the communication interface standard widely used in apparatus of this kind. In the communication system of this embodiment, using the RS-232C system communication channel, the data can be read out only by voltage conversion.

Since the communication is carried out cyclically and can be free-running, the correct content of the communication is restored immediately in case of a dropout or inadvertent error in the communication.

Furthermore, only the transmission line is needed, an expensive interface is not used, the communication and related functions can all be carried out by a one-chip microcomputer, and bidirectional digital data communication can be realized by inexpensive home LSIs.

In addition, since synchronization of the communication is established by the master apparatus, even when a plurality of operations A, B, C and D (FIGS. 10A and 10B) in addition to the communication must be performed in a time division manner, it is possible to prevent a given operation from being interrupted while in progress.

That is, when synchronization of the communication is not established and an expensive interface is not employed, the communication may be carried out in the midst of one operation as shown in FIG. 10A so that other operations cannot be carried out. In this embodiment, since the synchronization of the communication is established by the master apparatus and other operations are carried out in the pause or stop interval of constant length, the control of the time division multiplexing processing becomes easy as shown in FIG. 10B. As a result, there is the advantage that the signal processing can be carried out by an inexpensive microcomputer.

In the embodiment described above, the communication is started in synchronism with the vertical sync signal VD itself; alternatively, communication may be started in synchronism with a signal synchronized with the vertical sync signal: for example, a signal indicative of the rotary phase of a rotary head and a switching signal for two rotary heads.

While the embodiment described above is the special case where communication can be realized by a single communication line, the present invention can be applied also to a case where two lines for transmission and reception, respectively, extend from the master apparatus to a plurality of slave apparatus.

While in the embodiment described above a check is made at intervals of one bit to determine whether or not the transmission area is vacant, a check may be made at intervals of, for example, one word (8 bits).

If in the embodiment of FIG. 2 the earlier areas $P_1$ and $P_2$ are assigned as transmission periods of the slave apparatus and the later areas $P_3$ and $P_4$ are assigned as transmission periods of the master apparatus, only the start bit of the first half can always be transmitted cyclically, while the start bit of the second half can be transmitted only when data is transmitted from the master apparatus. Further, if the reception of incoming data is carried out before the transmission of outgoing data, it is possible to reduce considerably the buffer memories that store the data in the communication controller 212 and the microcomputer 210 of the slave apparatus.

In accordance with the present invention, since the transmission from the slave apparatus is carried out by using a selected unoccupied area of the plurality of time division areas, the number of time division areas can be smaller than the number of slave apparatus; in addition, the unused areas are reduced and the efficiency of use is increased. Furthermore, when the communication is carried out at a constant period, for example the vertical period, it is possible to prevent the length of the communication interval from becoming too long. Accordingly, it is possible to preserve the time necessary for carrying out operations other than communication during the stop mode interval Further, according to the present invention, since the communication is carried out periodically, if the communication is carried out once erroneously, the correct data is transmitted on the next occasion, whereby the erroneous communication is restored to the correct one. In addition, according to the present invention, since the communication is carried out in synchronism with a signal synchronized with the vertical sync signal it is possible to transmit as communication data signals corresponding to the frame number and field of the video signal.

Furthermore, since the communication timing can be predicted, the design of the hardware of the peripheral apparatus and the main body is simplified.

In addition, since the communication is carried out in synchronism with the vertical period, the mixing of noise into the picture due to the communication or the like can be detected easily and the debugging period is reduced.

Thus there is provided in accordance with the invention a novel and highly effective method and apparatus for communication between video information apparatus, such as a VTR or video disc player, and peripheral apparatus, such as a tuner, a timer, a video camera, editing apparatus, a computer and so on. Many modifications of the preferred embodiment of the invention described above will readily occur to those skilled in the art without departing from the spirit or scope of the invention. Accordingly, the invention is defined by the appended claims only.

We claim:

1. A system for communicating between master video apparatus and a plurality of peripheral apparatus wherein video signals organized into vertical periods of successive fields are processed; said system comprising:
   means for generating timing signals synchronously with said vertical periods;
   means for establishing first communication intervals having a substantially constant phase relation with respect to said timing signals;

communication means for effecting communication between said master apparatus and said peripheral apparatus during said first communication intervals;

said first communication intervals being divided into separate transmission areas, a plurality of said transmission areas being reserved for transmission of communications by said peripheral apparatus, the number of said reserved areas being less than the number of said peripheral apparatus; and means independent of said master apparatus whereby one of said peripheral apparatus can preempt one of said reserved areas for transmission therein.

2. A system according to claim 1; further comprising:

means for establishing a window within which said timing signals normally appear;.

detecting means for detecting the presence of said timing signals within said window;

free-running timing means for establishing second communication intervals; and means responsive to failure of said detecting means to detect said timing signals within said window for temporarily substituting said second communication intervals for said first communication intervals, whereby said communication temporarily takes place during the second communication intervals.

3. A system according to claim 2; wherein said first and second intervals respectively have periods such that, in case of communication in said second intervals, said timing signals ultimately reappear within said window and said communication then takes place in said first intervals.

4. A system according to claim 1; further comprising a transmission line connecting said master apparatus with each of said peripheral apparatus and wherein said preempting means comprises means in each of said peripheral apparatus for monitoring the state of said transmission line, for comparing the state thereof with the data transmitted thereto, and for terminating transmission in said area in case of a discrepancy between the state of said transmission line and the state of data transmitted thereto.

5. A system according to claim 4, wherein said transmitted data consists of bits representing "0's" and "1's" and said transmission line assumes two states respectively in accordance with said "0's" and "1's", and in case of competing transmissions by two of said peripheral apparatus in the same transmission area, where one of said periperal apparatus transmits a "0" and another of said peripheral apparatus transmits a "1", the state of said line follows a selected bit representing one of said "0" and "1" in preference to the other, the one of said peripheral apparatus having transmitted the selected bit preempting said transmission area and the other of said peripheral apparatus yielding said transmission area.

6. A system according to claim 5; wherein transmission of a "1" by one of said peripheral apparatus grounds said transmission line, whereby simultaneous transmission of a "0" by any other of said peripheral apparatus results in an inconsistency between said data transmitted by such other of said peripheral apparatus and the state of said transmission line, causing said one of said peripheral apparatus to preempt said transmission area and said other of said peripheral apparatus to yield said transmission area.

* * * * *